Patented Mar. 29, 1938

2,112,712

UNITED STATES PATENT OFFICE 2,112,712

OESTROGENOUS PRODUCTS AND METHODS OF PRODUCING THE SAME

Walter Schoeller, Berlin-Westend, Max Dohrn, Berlin-Charlottenburg, and Walter Hohlweg, Hohen-Neuendorf, near Berlin, Germany, assignors to Schering-Kahlbaum A. G., Berlin, Germany, a corporation of Germany No Drawing. Application June 11, 1934, Serial No. 730,066. In Germany June 13, 1933

2 Claims. (Cl. 167—74)

This invention relates to oestrogenous products, and more particularly to oestrogenous products and methods of producing the same from plants, such as *Butea superba* and the like.

One object of this invention is to provide oestrogenous products having a high efficiency on application per os. The hitherto known oestrogenous preparations, for instance the follicle hormones and the like, exhibit a considerably lower efficiency on application per os than on subcutaneous application. The new products are obtained by subjecting plants or parts of plants of the genus Butea to the known methods of producing follicle hormones, which includes extraction, adsorption, salting out and combinations of these methods. Especially the roots of said plants of the bean family having tubers, are rich in oestrogenous products of high efficiency on application per os.

The new starting materials, particularly the tropical species of the genus Butea, possess such a high amount of said oestrogenous compounds that already by simple extraction highly effective preparations are obtained. The extracts after purification, are especially suitable for carrying out by application per os the Kaufmann therapy (Zentralblatt für Gynaekologie 1932, No. 34) which requires large amounts of oestrogenous substances (about 100,000 mouse units and more). Hitherto it was necessary to apply these large amounts of hormones by several subcutaneous injections since the known hormone preparations obtained, for instance, from the urine of pregnant women or animals possess only a low efficiency on application per os. These new preparations obtained according to this invention enable one to treat even the most serious cases of female sex hormone insufficiency by application per os.

Example 9 kilograms of tubers of *Butea superba* are cut to pieces, dried and pulverized. The dry powder obtained, weighing about 1800 grams, is extracted by means of alcohol. The alcohol extract is separated from the plant material by filtration and the alcohol is driven off by evaporation; a residue of 285 grams of a dark-brown malt-like mass remains which has an agreeable, malt-like odor. On assaying said product exhibits an efficiency of 28,500 mouse units per gram on subcutaneous application and 14,250 mouse units per gram on application per os. Hence, one kilogram of the fresh tubers contains about 900,000 mouse units effective on subcutaneous application and about 450,000 mouse units effective on application per os; while 1 kilogram of the urine of mares in the advanced state of gestation, said urine hitherto representing the best starting material for the production of oestrogenous products, possesses at the most about 15,000 mouse units effective on application per os.

Instead of using the tubers of *Butea superba*, also other parts of the plant, and instead of *Butea superba* other similar plants may be used as starting material.

Instead of alcohol other organic solvents, such as methyl alcohol, acetone and the like, may be used.

Other methods of isolating said oestrogenous products than by extraction with alcohol may be employed, as they are known to the expert for isolating oestrogenous products from other starting materials, such as urine, organs and the like.

However, since the new oestrogenous products obtained from *Butea superba* and similar plants are not chemically identical with the known follicle hormone as the Butea hormone has the formula $C_{19}H_{22}O_6$ and melts at approximately 276° C. (when crystallized from methyl alcohol), whereas the follicle hormone has the formula $C_{18}H_{22}O_2$ and melts at 256° C. (crystallized from alcohol), the methods of isolating said new oestrogenous products have to be adapted to the properties of the latter. We have found that the extraction must exclude the employment of strong chemicals, such as strong alkaline solutions or strong inorganic acids, as these destroy the physiological properties of the hormone although strong alkalies and certain strong inorganic acids have no destructive effect on the follicle hormone.

Of course, many other variations and changes may be made by those skilled in the art in accordance with the principles set forth herein and in the claims annexed hereto.

In the annexed claims, the term "extraction" is to be understood to include any method suitable for the separation of the hormone-like substance or substances from the vegetable material, and includes extraction with solvents, adsorption, salting out, etc.

What we claim is:

1. An oestrogenous product isolated from a plant of the species *Butea superba*, said product exerting biological effects similar to those of the follicle hormones and having the general formula $C_{19}H_{22}O_6$ and a melting point of approximately 276° C. when crystallized from methyl alcohol, its efficiency on application per os being as much as approximately one-half its efficiency on subcutaneous application, and being distinguished from the follicle hormones by its chemical properties, especially by its sensitivity towards strong alkaline solutions.

2. An oestrogenous product isolated from the roots of *Butea superba*, said product exerting biological effects similar to those of the follicle hormones and having the general formula $C_{19}H_{22}O_5$ and a melting point of approximately 276° C. when crystallized from methyl alcohol, its efficiency on application per os being as much as approximately one-half its efficiency on subcutaneous application, and being distinguished from the follicle hormones by its chemical properties, especially by its sensitivity towards strong alkaline solutions.

WALTER SCHOELLER.
MAX DOHRN.
WALTER HOHLWEG.